(12) United States Patent
Kwon et al.

(10) Patent No.: US 12,273,816 B2
(45) Date of Patent: *Apr. 8, 2025

(54) APPARATUS AND METHODS FOR SIGNALING IN POWER SAVE MODE

(71) Applicant: Huawei Technologies Co., Ltd., Shenzhen (CN)

(72) Inventors: Young Hoon Kwon, Laguna Niguel, CA (US); Pengfei Xia, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,037

(22) Filed: Dec. 20, 2023

(65) Prior Publication Data

US 2024/0121714 A1  Apr. 11, 2024

Related U.S. Application Data

(63) Continuation of application No. 17/277,612, filed as application No. PCT/US2019/046296 on Aug. 13, 2019, now Pat. No. 11,856,518.

(Continued)

(51) Int. Cl.
*H04W 52/02*  (2009.01)
*H04W 16/28*  (2009.01)
*H04W 68/00*  (2009.01)
*H04W 72/044*  (2023.01)
*H04W 72/23*  (2023.01)

(52) U.S. Cl.
CPC ....... *H04W 52/0232* (2013.01); *H04W 16/28* (2013.01); *H04W 68/005* (2013.01); *H04W 72/046* (2013.01); *H04W 72/23* (2023.01)

(58) Field of Classification Search
CPC ............ H04W 52/0232; H04W 16/28; H04W 68/005; H04W 72/046; H04W 72/23;
(Continued)

(56) References Cited

U.S. PATENT DOCUMENTS 9,204,395 B2   12/2015  Li et al.
2004/0008679 A1  1/2004  Sinnarajah et al.
(Continued)

FOREIGN PATENT DOCUMENTS

CN   108282862 A   7/2010
CN   104427591 A   3/2015
(Continued)

*Primary Examiner* — Kiet Tang
(74) *Attorney, Agent, or Firm* — Slater Matsil, LLP

(57) ABSTRACT

Embodiments of this disclosure provide techniques for signaling in power save mode. In particular, a UE may identify an association between a set of time durations for paging a downlink control indicator (DCI) transmission and a wake up signal (WUS) in a set of WUSs. Paging the DCI is transmitted in a beam sweeping manner and each beam used in each time duration in the set of time durations corresponds to a respective beam used for a WUS transmission in the set of WUSs. The UE monitors a radio link quality of WUSs in the set of WUSs and, based thereon, selects a first WUS in the set of WUSs. The UE identifies a first time duration for DCI page monitoring, the first time duration corresponding to the first WUS. The UE monitors the DCI page during the first time duration.

20 Claims, 10 Drawing Sheets

Related U.S. Application Data

(60) Provisional application No. 62/732,669, filed on Sep. 18, 2018.

(58) Field of Classification Search
CPC ............ H04W 52/0229; H04W 76/28; H04W 52/0216; H04W 52/0235; H04W 68/02; H04W 68/00; H04B 7/0695; H04B 7/088; H04L 5/0053; H04L 5/0048; Y02D 30/70
See application file for complete search history.

(56) References Cited

U.S. PATENT DOCUMENTS

| | | | |
|---|---|---|---|
| 2007/0259675 A1* | 11/2007 | Worrall | H04W 68/02 455/458 |
| 2017/0302355 A1 | 10/2017 | Islam et al. | |
| 2018/0026698 A1 | 1/2018 | Lee et al. | |
| 2018/0027522 A1 | 1/2018 | Lee et al. | |
| 2018/0192371 A1 | 7/2018 | Jung et al. | |
| 2018/0220288 A1 | 8/2018 | Agiwal et al. | |
| 2018/0270756 A1 | 9/2018 | Bhattad et al. | |
| 2019/0053321 A1 | 2/2019 | Islam et al. | |
| 2019/0200296 A1* | 6/2019 | Liu | H04W 24/10 |
| 2019/0254110 A1* | 8/2019 | He | H04L 41/0896 |
| 2019/0320490 A1 | 10/2019 | Liu et al. | |
| 2020/0029386 A1 | 1/2020 | Nam et al. | |
| 2020/0100212 A1 | 3/2020 | Lee et al. | |

FOREIGN PATENT DOCUMENTS

| | | |
|---|---|---|
| CN | 106797573 A | 5/2017 |
| CN | 107079403 A | 8/2017 |
| TW | 201831026 A | 8/2018 |
| WO | 2018064358 A1 | 4/2018 |
| WO | 2018127025 A1 | 7/2018 |

\* cited by examiner

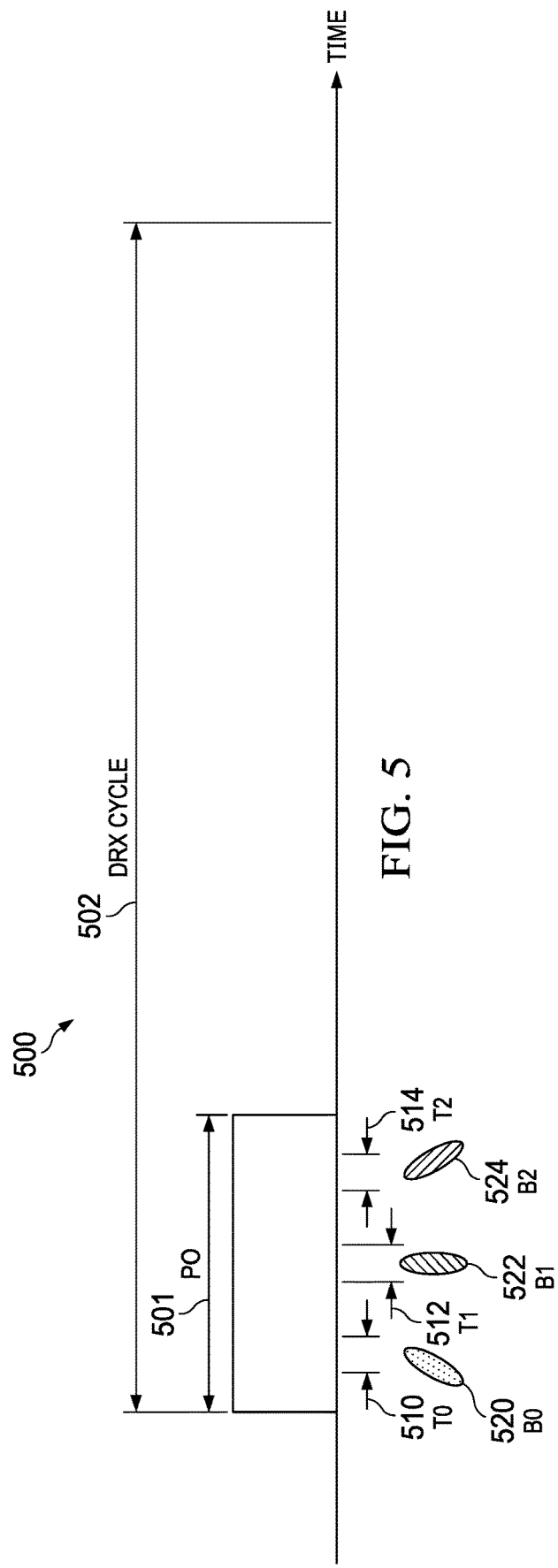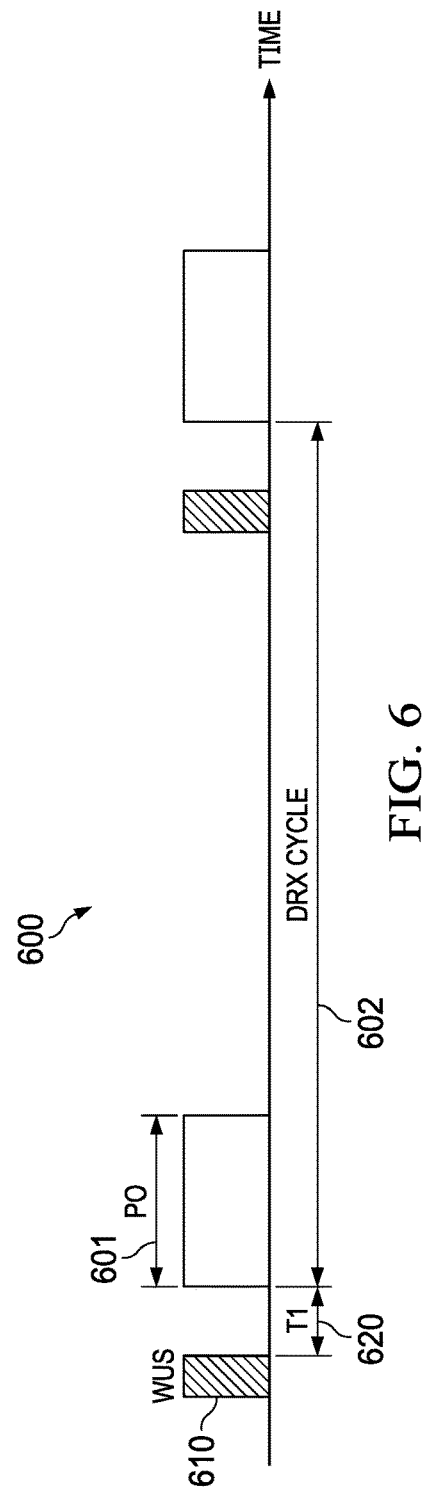

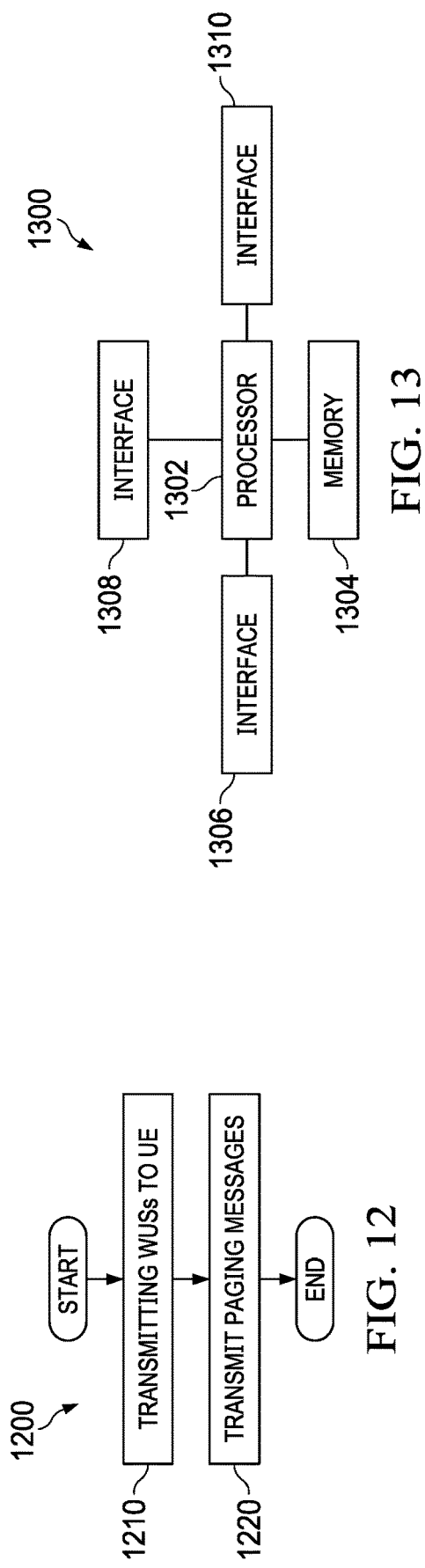
FIG. 12
FIG. 13
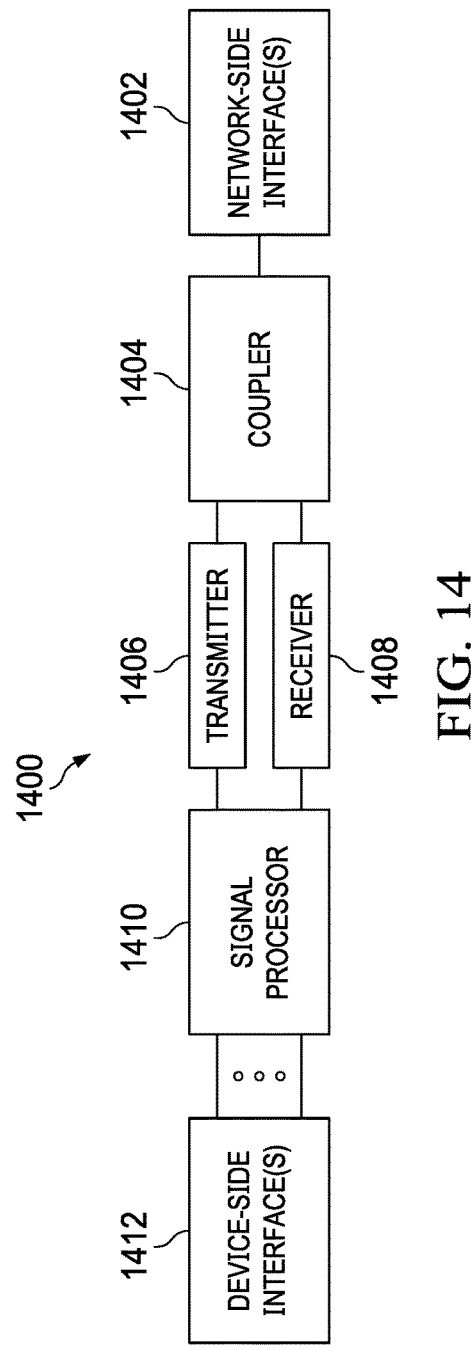
FIG. 14

APPARATUS AND METHODS FOR SIGNALING IN POWER SAVE MODE

CROSS-REFERENCE TO RELATED APPLICATIONS

This patent application is a continuation of U.S. patent application Ser. No. 17/277,612, entitled "Apparatus and Methods for Signaling in Power Save Mode," filed on Mar. 18, 2021, now U.S. Pat. No. 11,856,518 issued on Dec. 26, 2024, which is a national phase filing under section 371 of PCT Application PCT/US2019/046296, entitled "Apparatus and Methods for Signaling in Power Save Mode," filed on Aug. 13, 2019 which claims priority to U.S. Provisional Patent Application Ser. No. 62/732,669, entitled "Apparatus and Methods for Signaling in Power Save Mode," filed on Sep. 18, 2018, which application is hereby incorporated by reference herein in its entirety.

TECHNICAL FIELD

The present disclosure relates generally to digital communications, and, in particular embodiments, to systems and methods for signaling in power save mode.

BACKGROUND

Generally, modern wireless communication systems use multiple radio frequency (RF) chains and multiple antennas with beamforming management for improved system performance. The systems that take advantage of this technology typically operate at millimeter wave frequencies and above, which suffer from high path loss. To overcome high path loss, beamforming techniques may be used to increase signal gain. This is typically done by shaping and/or directing beams used for signal transmission and/or reception

SUMMARY

Technical advantages are generally achieved by embodiments of this disclosure, which describe systems and methods for signaling in power save mode.

A first aspect relates to a method for signaling in power save mode. The method includes transmitting, by a base station, a plurality of wake up signals (WUSs) to a user equipment (UE), each WUS indicating to the UE to monitor a control channel of a different beam in a multi-beam operation for an associated paging message during a configured period of a paging occasion of a discontinuous reception (DRX) cycle. The method further includes transmitting, by the base station, a plurality of paging messages to the UE during the paging occasion, each paging message transmitted in accordance with an associated WUS over the different beam at the configured period of the paging occasion.

In a first implementation form of the method according to the first aspect as such, the plurality of WUSs are transmitted in a unicast message, a groupcast message, or a broadcast message.

In a second implementation form of the method according to the first aspect as such, or any preceding implementation form of the first aspect, the method further includes transmitting, by the base station, the plurality of WUSs to a second UE, each WUS indicating to the second UE to monitor a second control channel of a different beam in a second multi-beam operation for an associated paging message during a configured period of a second paging occasion of a discontinuous reception (DRX) cycle of the second UE. The method further includes transmitting, by the base station, the plurality of paging messages to the second UE during the second paging occasion, each paging message transmitted in accordance with an associated WUS over the different beam at the configured period of the paging occasion of the second UE.

In a third implementation form of the method according to the first aspect as such, or any preceding implementation form of the first aspect, each paging message is transmitted multiple times over different multi-beam operations.

In a fourth implementation form of the method according to the first aspect as such, or any preceding implementation form of the first aspect, the plurality of WUSs are transmitted before a beginning of the paging occasion.

In a fifth implementation form of the method according to the first aspect as such, or any preceding implementation form of the first aspect, a time gap between an end of the transmitting of the plurality of WUSs and a beginning of the transmitting of the plurality of page messages is a non-zero time gap.

In a sixth implementation form of the method according to the first aspect as such, or any preceding implementation form of the first aspect, one or more of the plurality of WUSs are transmitted during the paging occasion, each respective WUS is transmitted before the associated paging message is transmitted.

In a seventh implementation form of the method according to the first aspect as such, or any preceding implementation form of the first aspect, a time gap between an end of a transmitting of each WUS and a beginning of a transmitting of the associated paging message is a non-zero time gap.

In an eight implementation form of the method according to the first aspect as such, or any preceding implementation form of the first aspect, the non-zero time gap is predetermined in accordance with a radio resource control (RRC) protocol.

In a ninth implementation form of the method according to the first aspect as such, or any preceding implementation form of the first aspect, each WUS is transmitted after an elapsed non-zero time gap from a transmission of a previous WUS in the plurality of WUSs.

In a tenth implementation form of the method according to the first aspect as such, or any preceding implementation form of the first aspect, the method further includes configuring, by the base station, the plurality of WUSs before transmitting each WUS to the UE.

In an eleventh implementation form of the method according to the first aspect as such, or any preceding implementation form of the first aspect, the configuring is cell-specific, group-specific, or UE-specific.

In a twelfth implementation form of the method according to the first aspect as such, or any preceding implementation form of the first aspect, each WUS further indicates to the UE to monitor the control channel of the respective beam, during the paging occasion, for N consecutive DRX cycles.

In a thirteenth implementation form of the method according to the first aspect as such, or any preceding implementation form of the first aspect, the plurality of WUSs include a one-to-N mapping with one or more paging occasions in multiple consecutive DRX cycles, wherein N is an integer greater than zero.

In a fourteenth implementation form of the method according to the first aspect as such, or any preceding implementation form of the first aspect, the control channel is a physical downlink control channel (PDCCH).

In a fifteenth implementation form of the method according to the first aspect as such, or any preceding implementation form of the first aspect, each WUS is transmitted over a different respective beam.

In a sixteenth implementation form of the method according to the first aspect as such, or any preceding implementation form of the first aspect, each paging message is a paging downlink control indicator (DCI).

In a seventeenth implementation form of the method according to the first aspect as such, or any preceding implementation form of the first aspect, each paging message is radio access network (RAN) initiated paging or core network (CN) initiated paging.

In an eighteenth implementation form of the method according to the first aspect as such, or any preceding implementation form of the first aspect, a length of a paging occasion corresponds to one period of beam sweeping in a multi-beam operation.

In a nineteenth implementation form of the method according to the first aspect as such, or any preceding implementation form of the first aspect, each WUS further indicates to the UE that the plurality of paging messages are to be transmitted to the UE during the paging occasion.

In a twentieth implementation form of the method according to the first aspect as such, or any preceding implementation form of the first aspect, each WUS further indicates to the UE that the plurality of paging messages are not to be transmitted to the UE during the paging occasion.

In a twenty first implementation form of the method according to the first aspect as such, or any preceding implementation form of the first aspect, each beam in the multi-beam operation is quasi co-located (QCL'ed) with a corresponding WUS in the plurality of WUSs.

In a twenty second implementation form of the method according to the first aspect as such, or any preceding implementation form of the first aspect, a plurality of beams in the multi-beam operation is quasi co-located (QCL'ed) with a corresponding WUS in the plurality of WUSs.

In a twenty third implementation form of the method according to the first aspect as such, or any preceding implementation form of the first aspect, each beam is a synchronization signal block (SSB) beam.

In a twenty fourth implementation form of the method according to the first aspect as such, or any preceding implementation form of the first aspect, each WUS further indicates to the UE to monitor a control channel of a second different beam in the multi-beam operation for a second associated paging message during a second configured period of the paging occasion of the discontinuous reception (DRX) cycle.

In a twenty fifth implementation form of the method according to the first aspect as such, or any preceding implementation form of the first aspect, each WUS further indicates to the UE an associated identifier (ID) of an intended UE associated with the WUS.

In a twenty sixth implementation form of the method according to the first aspect as such, or any preceding implementation form of the first aspect, one or more of the WUSs are transmitted to the UE using a different frequency resource.

In a twenty seventh implementation form of the method according to the first aspect as such, or any preceding implementation form of the first aspect, one or more of the WUSs are transmitted to the UE using a same frequency resource.

In a twenty eight implementation form of the method according to the first aspect as such, or any preceding implementation form of the first aspect, one or more of the WUSs are transmitted using a same sequence.

In a twenty ninth implementation form of the method according to the first aspect as such, or any preceding implementation form of the first aspect, one or more of the WUSs are transmitted using a different sequence.

A second aspect relates to a method for signaling in power save mode. The method includes receiving, by a user equipment (UE), a wake up signal (WUS) from a base station, the WUS indicating to the UE to monitor a control channel of a respective beam in a multi-beam operation for an associated paging message during a configured period of a paging occasion of a discontinuous reception (DRX) cycle. The method further includes monitoring, by the UE, the control channel of the respective beam during the paging occasion in accordance with the received WUS.

In a first implementation form of the method according to the second aspect as such, the method further includes measuring, by the UE, a signal quality of the WUS; and determining, by the UE, that a signal quality of the WUS meets a quality threshold, and based thereon, identifying a corresponding beam.

In a second implementation form of the method according to the second aspect as such, or any preceding implementation form of the second aspect, the determining is completed before a beginning of the paging occasion.

In a third implementation form of the method according to the second aspect as such, or any preceding implementation form of the second aspect, the determining includes determining the signal quality in accordance with a received power level of the WUS, a signal-to-noise ratio (SNR) level of the WUS, a signal-to-noise-plus-interference ratio (SINR) level of the WUS, or a combination thereof.

In a fourth implementation form of the method according to the second aspect as such, or any preceding implementation form of the second aspect, the determining further includes identifying the corresponding beam before a beginning of a configured period of a paging occasion to monitor for a paging message for that beam.

In a fifth implementation form of the method according to the second aspect as such, or any preceding implementation form of the second aspect, the method further includes determining, by the UE, that a signal quality of the WUS is less than a quality threshold, and based thereon, ignoring the monitoring of a control channel of the respective beam for an associated paging message during the configured period of the paging occasion.

In a sixth implementation form of the method according to the second aspect as such, or any preceding implementation form of the second aspect, the UE is operating in DRX mode in an idle radio resource control (RRC_IDLE) state.

In a seventh implementation form of the method according to the second aspect as such, or any preceding implementation form of the second aspect, the UE is an internet of things (IoT) device.

In an eight implementation form of the method according to the second aspect as such, or any preceding implementation form of the second aspect, the UE is operating in accordance with NarrowBand-IoT (NB-IoT) standards.

A third aspect relates to a base station that includes a non-transitory memory storage including instructions; and one or more processors in communication with the non-transitory memory storage, wherein the one or more processors execute the instructions to: transmit a plurality of wake up signals (WUSs) to a user equipment (UE), each WUS indicating to the UE to monitor a control channel of a different beam in a multi-beam operation for an associated paging message during a configured period of a paging occasion of a discontinuous reception (DRX) cycle; and transmit a plurality of paging messages to the UE during the paging occasion, each paging message transmitted in accordance with an associated WUS over the different beam at the configured period of the paging occasion.

A fourth aspect relates to a non-transitory computer-readable media storing computer instructions for signaling in power save mode, that when executed by one or more processors, cause the one or more processors to perform the steps of: transmitting a plurality of wake up signals (WUSs) to a user equipment (UE), each WUS indicating to the UE to monitor a control channel of a different beam in a multi-beam operation for an associated paging message during a configured period of a paging occasion of a discontinuous reception (DRX) cycle; and transmitting a plurality of paging messages to the UE during the paging occasion, each paging message transmitted in accordance with an associated WUS over the different beam at the configured period of the paging occasion.

A fifth aspect relates to a computer-implemented method for signaling in power save mode, that when executed by one or more processors, cause the one or more processors to perform the steps of: transmitting a plurality of wake up signals (WUSs) to a user equipment (UE), each WUS indicating to the UE to monitor a control channel of a different beam in a multi-beam operation for an associated paging message during a configured period of a paging occasion of a discontinuous reception (DRX) cycle; and transmitting a plurality of paging messages to the UE during the paging occasion, each paging message transmitted in accordance with an associated WUS over the different beam at the configured period of the paging occasion.

A sixth aspect relates to a user equipment (UE) that includes a non-transitory memory storage including instructions; and one or more processors in communication with the non-transitory memory storage, wherein the one or more processors execute the instructions to: receive a wake up signal (WUS) from a base station, the WUS indicating to the UE to monitor a control channel of a respective beam in a multi-beam operation for an associated paging message during a configured period of a paging occasion of a discontinuous reception (DRX) cycle; and monitor the control channel of the respective beam during the paging occasion in accordance with the received WUS.

A seventh aspect relates to a non-transitory computer-readable media storing computer instructions for signaling in power save mode, that when executed by one or more processors, cause the one or more processors to perform the steps of: receiving a wake up signal (WUS) from a base station, the WUS indicating to monitor a control channel of a respective beam in a multi-beam operation for an associated paging message during a configured period of a paging occasion of a discontinuous reception (DRX) cycle; and monitoring the control channel of the respective beam during the paging occasion in accordance with the received WUS.

An eight aspect relates to a computer-implemented method for signaling in power save mode, that when executed by one or more processors, cause the one or more processors to perform the steps of: receiving a wake up signal (WUS) from a base station, the WUS indicating to monitor a control channel of a respective beam in a multi-beam operation for an associated paging message during a configured period of a paging occasion of a discontinuous reception (DRX) cycle; and monitoring the control channel of the respective beam during the paging occasion in accordance with the received WUS.

Embodiments can be implemented in hardware, software, or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 is a DRX cycle timing diagram for an embodiment multi-beam operation, as may be performed by a UE in RRC_IDLE state;

FIG. 6 is a DRX cycle timing diagram for an embodiment WUS operation, as may be performed by a UE in RRC_IDLE state;

FIG. 12 is a flowchart of an embodiment method for signaling in power save mode in a DRX operation, as may be performed by a base station;

FIG. 13 is a diagram of an embodiment processing system; and

FIG. 14 is a diagram of an embodiment transceiver.

DETAILED DESCRIPTION OF ILLUSTRATIVE EMBODIMENTS

Figure 1:
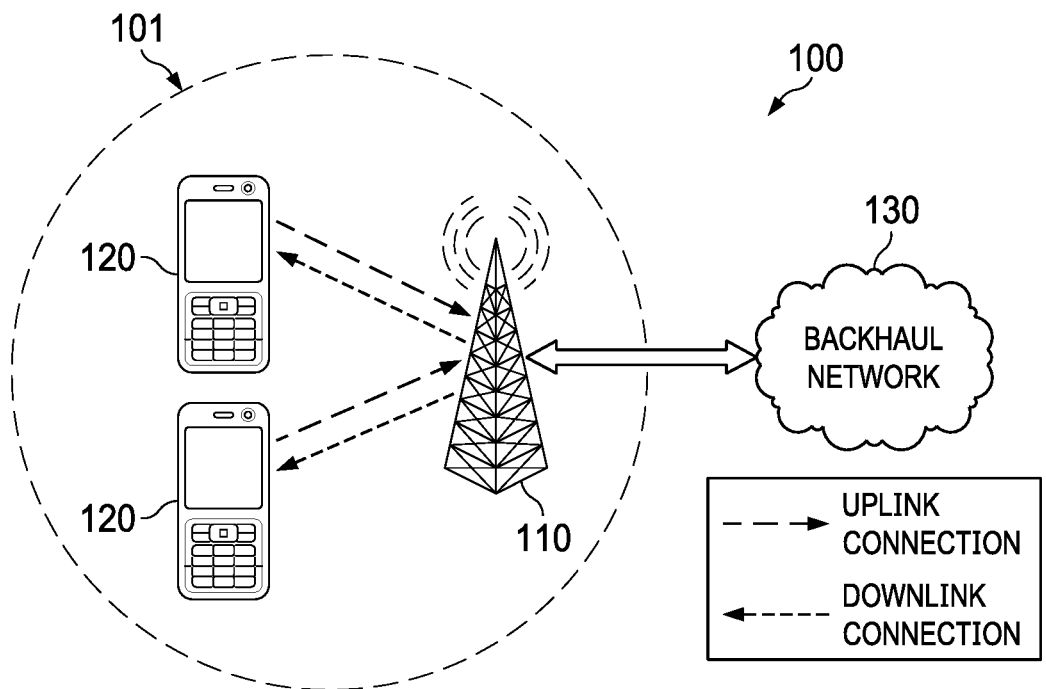
FIG. 1 is a diagram of an embodiment wireless communications network.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of 5G wireless networks, it should also be appreciated that these inventive aspects may also be applicable to 4G, 3G, and other wireless networks.

5G New Radio (NR) wireless communication networks provide support for simultaneous communication streams in both downlink and uplink channel paths. A user equipment (UE), capable of operating within the 5G NR network, is configured to receive and transmit communication signals over multiple beams formed between the UE and a base station. Accordingly, techniques and methods to monitor a paging occasion in a wireless communication using multiple beams are desired.

Embodiments of this disclosure provide techniques for signaling in a power save mode for wireless communications using multiple-beams. In particular, in one embodiment, a UE receives a wake up signal from a base station. The wake up signal indicates to the UE to monitor a control channel of a respective beam in a multi-beam operation. The wake up signal corresponds with an associated paging message during a configured period of a paging occasion of a discontinuous reception (DRX) cycle. The UE then monitors the control channel of the respective beam in the set of beams during the paging occasion in accordance with the received wake up signal.

In an embodiment, the UE, measures a signal quality of the wake up signal and determines whether or not a signal quality of the wake up signal meets a quality threshold, and based thereon, identifies a corresponding beam to monitor. The determining step may be completed before a beginning of the paging occasion. The signal quality may be determined in accordance with a received power level of the wake up signal, a signal-to-noise ratio (SNR) level of the wake up signal, a signal-to-noise-plus-interference ratio (SINR) level of the wake up signal, or a combination thereof. Identifying the corresponding beam may occur before a beginning of a configured period of a paging occasion to monitor for a paging message for that beam. In this embodiment, the UE may be operating in DRX mode in an idle radio resource control (RRC_IDLE) state. The UE may be an internet of things (IoT) device, operating in accordance with Narrow-Band-IoT (NB-IoT) standards.

In another embodiment, a base station transmits multiple wake up signals to one or more UEs. Each WUS indicates to a UE to monitor a control channel of a different beam in a multi-beam operation for an associated paging message during a configured period of a paging occasion of a discontinuous reception (DRX) cycle. The base station then transmits a plurality of paging messages to the UE during the paging occasion. Each paging message may be transmitted in accordance with an associated wake up signal over the different beam at the configured period of the paging occasion. The control channel may be a physical downlink control channel (PDCCH).

In all cases, a wake up signal may be transmitted over a different respective beam. The paging message may be a paging downlink control indicator (DCI), a radio access network (RAN) initiated paging, or core network (CN) initiated paging. A length of a paging occasion may correspond to one period of the beam sweeping in a multi-beam operation. Each beam in the multi-beam operation may be quasi co-located (QCL'ed) with a corresponding wake up signal. Additionally, a plurality of beams in the multi-beam operation may be quasi co-located (QCL'ed) with a corresponding wake up signal. Each beam may be a synchronization signal block (SSB) beam. A wake up signal may indicate to the UE to monitor the control channel of the respective beam, during the paging occasion, for N consecutive DRX cycles. The wake up signals may include a one-to-N mapping with one or more paging occasions in multiple consecutive DRX cycles, wherein N is an integer greater than zero. Each wake up signal may additionally indicate to the UE that the paging messages are to be transmitted to the UE during the paging occasion. A wake up signal may also indicate to the UE that the paging messages are not to be transmitted to the UE during the paging occasion. One or more of the wake up signals may be transmitted during the paging occasion and each wake up signal may be transmitted before the associated paging message is transmitted. A wake up signal may be transmitted in a unicast message, a groupcast message, or a broadcast message. A wake up signal may be transmitted before a beginning of the paging occasion. Each wake up signal may be transmitted after an elapsed non-zero time gap from a transmission of a previous wake up signal. The base station may configure the wake up signals before transmitting. Accordingly, the configuration of a wake up signal may be cell-specific, group-specific, or UE-specific. A wake up signal may indicate to the UE to monitor a control channel of a second beam in the multi-beam operation for a second associated paging message during a second configured period of the paging occasion of the discontinuous reception (DRX) cycle. Each wake up signal may indicate to the UE an associated identifier (ID) of an intended UE associated with the wake up signal. One or more of the wake up signals are transmitted to the UE using a different or a same frequency resource, and/or a different or a same sequence. The base station may additionally transmit the wake up signal to a second UE. In embodiments, each wake up signal is used to indicate to the second UE to monitor a second control channel of a different beam in a second multi-beam operation for an associated paging message during a configured period of a second paging occasion of a discontinuous reception (DRX) cycle of the second UE. The base station may then transmit paging messages to the second UE during the second paging occasion. Each paging message is transmitted in accordance with an associated wake up signal over the different beam at the configured period of the paging occasion of the second UE. Each paging message is transmitted multiple times over different multi-beam operations. The time gap between an end of the transmitting of the wake up signal and a beginning of the transmitting of the page messages may be a non-zero time gap. In embodiments, the time gap between an end of a transmitting of each wake up signal and a beginning of a transmitting of the associated paging message may be a non-zero time gap. In either embodiment, the non-zero time gap may be predetermined in accordance with a radio resource control (RRC) protocol. These and other details are discussed in greater detail below.

FIG. 1 is diagram of a network wo for communicating data. The network 100 includes a base station no having a coverage area 101, a plurality of UEs 120, and a backhaul network 130. As shown, the base station no establishes uplink (dashed line) and/or downlink (dotted line) connections with the UEs 120, which serve to carry data from the UEs 120 to the base station no and vice-versa.

Data communicated over the uplink/downlink connections may include data communicated between the UEs 120, as well as data communicated to/from a remote-end (not shown) by way of the backhaul network 130.

As used herein, the term "base station" refers to any network-side device configured to provide wireless access to a network, such as an enhanced Node B (eNodeB or eNB), a gNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc.

As used herein, the term "UE" refers to any user-side device configured to access a network by establishing a wireless connection with a base station, such as a mobile device, a mobile station (STA), a vehicle, and other wirelessly enabled devices. In some embodiments, the network wo may include various other wireless devices, such as relays, low power nodes, etc.

Figure 2:
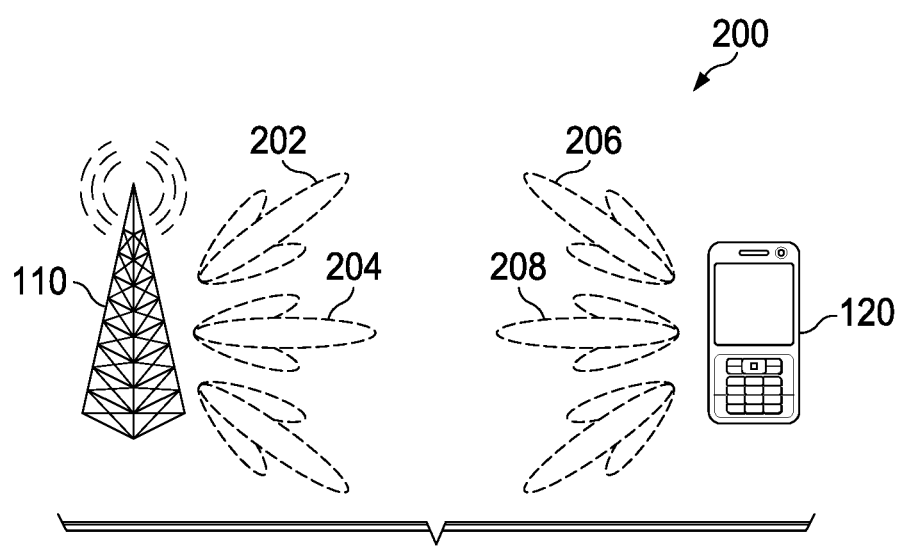
FIG. 2 is a diagram of an embodiment communications system including beamforming beams.

FIG. 2 illustrates a diagram of an embodiment communications system 200 used for wireless communication using beamforming beams, for example, between a base station 110 and a UE 120.

The embodiment communications system 200 may operate over a variety of frequencies, for example, at or above 6 gigahertz (GHz) (e.g., the millimeter wave (mmWave) frequency spectrum). In such an embodiment, the beamforming may be used to overcome the high path loss typically present at high frequencies.

The base station no may communicate with the UE 120, or any other device, using one or more communication beams, such as beams 202 and/or 204. The UE 120 in turn may communicate with the base station 110, or any other device, using one or more communication beams, such as beams 206 and/or 208.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that beamforming in the RF and digital domains may exist simultaneously. In an example case, a beam formed by RF beamforming is directed to a specific direction for communications between a UE and a base station. In addition, digital beamforming may be used to sharpen the transmit and/or receive communications over the beam.

It may be said that two or more reference signals, data signals, and/or resources have a quasi co-located (QCL) relationship when they share a similar characteristic. The similar characteristic may be with respect to time, frequency, code, and or a spatial relationship. When the similar characteristic is in the context of a spatial relationship, the relationship may be referred to as a spatial quasi co-located relationship. It is noted that throughout this disclosure, unless otherwise noted, the terms QCL and spatial QCL may be used interchangeably with each other.

Figure 3:
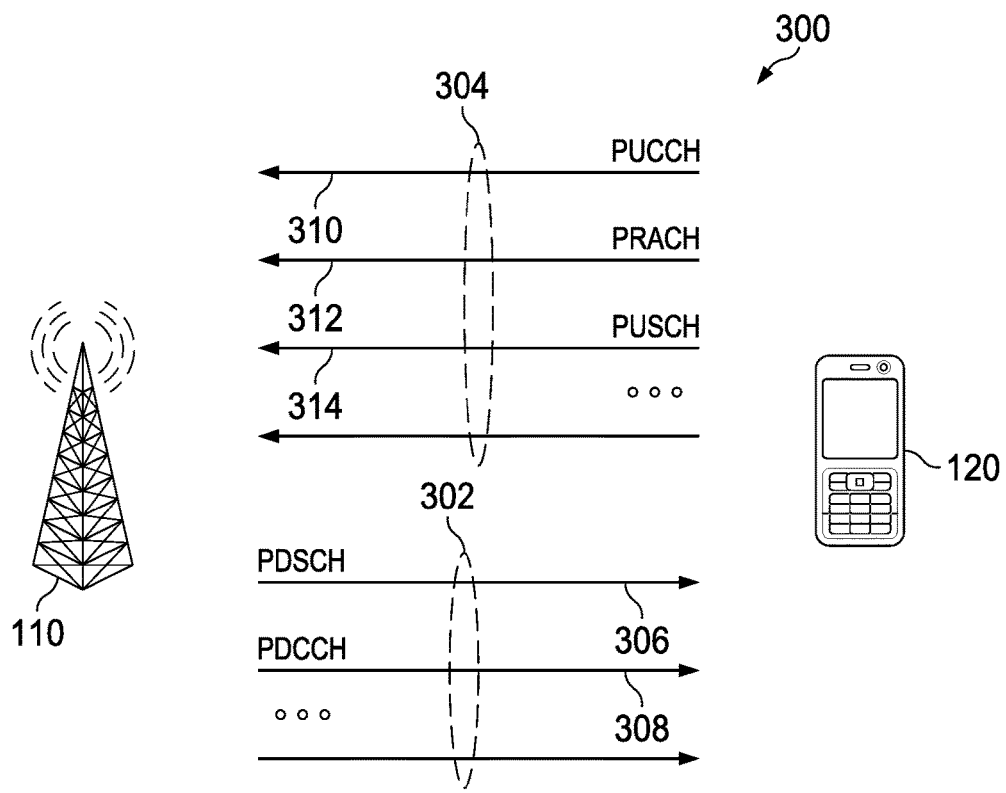
FIG. 3 is a diagram of an embodiment channel structure between a base station and a user equipment (UE)

FIG. 3 illustrates an embodiment communications system 300 highlighting an example channel structure, for example, between the base station no and the UE 120. In a bi-directional communications implementation, the base station no and the UE 120 are in communication through a downlink channel 302 and an uplink channel 304. In some embodiments, the downlink channel 302 and the uplink channel 304 may each include multiple uni-directional channels. The downlink channel 302 may include a physical downlink shared channel (PDSCH) 306 and a physical downlink control channel (PDCCH) 308. The uplink channel 304 may include a physical uplink control channel (PUCCH) 310, a physical random access channel (PRACH) 312, and a physical uplink shared channel (PUSCH) 314. The downlink channel 302 and uplink channel 304 may include other channels.

During standardization activities for fifth generation (5G) New Radio (NR) system, the concept of discontinuous reception for paging, and particularly for a UE in Radio Resource Control IDLE (RRC_IDLE) state was defined. The concept is based on the discontinuous reception (DRX) for paging for a UE in RRC_IDLE state as defined in 3GPP Long Term Evolution (LTE) standard.

In this concept, a UE may use a DRX cycle in RRC_IDLE and RRC_INACTIVE state in order to reduce power consumption. The UE may monitor one paging occasion (PO) per DRX cycle. A paging occasion is a set of physical downlink control channel (PDCCH) monitoring occasions and can consist of multiple time slots (e.g. subframe or orthogonal frequency-division multiplexing (OFDM) symbol) where paging Downlink Control Indicator (DCI) can be sent. One Paging Frame (PF) is one Radio Frame and may contain one or multiple PO(s) or a starting point of a PO. A DRX cycle is configured by a base station, and the DRX cycle can be UE specific and/or cell specific. The UE can go to sleep state outside of the paging occasion in each DRX cycle to save power consumption.

The paging frame and paging occasion are determined as:
System frame number (SFN) for the paging frame is determined by:

$$(SFN+PF\_\text{offset}) \bmod T = (T \text{ div } N)*(UE\_ID \bmod N)$$

Index (i_s), indicating the start of a set of PDCCH monitoring occasions for the paging DCI, is determined by:

$$i\_s = \text{floor } (UE\_ID/N) \bmod Ns; \text{ where, } Ns = \max(1, nB/T).$$

The PDCCH monitoring occasions for paging are determined according to paging-SearchSpace if configured and according to the default association (i.e., PDCCH monitoring occasions for paging are same as for remaining minimum system information (RMSI)) otherwise.

For default association, Ns is either 1 or 2. For Ns=1, there is one paging occasion which starts in the paging frame. For Ns=2, paging occasion is either in the first half frame (i_s=0) or the second half frame (i_s=1) of the paging frame.

For non-default association (i.e., when paging-SearchSpace is used), the UE monitors the $(i\_s+1)^{th}$ paging occasion where the first paging occasion starts in the paging frame.

The following parameters are used for the calculation of paging frame and i_s index above: T corresponds to a DRX cycle of the UE. T is determined by the shortest of the UE specific DRX value, if configured by RRC or upper layers, and a default DRX value broadcast in system information. If UE specific DRX is not configured by upper layers, the default value is applied. nB is the number of total paging occasions in T, where N: min(T,nB), PF_offset: offset used for paging frame determination, and UE_ID: IMSI mod 1024.

The parameters nB, PF_offset, and the length of default DRX Cycle are signaled in SystemInformationBlock1.

If the UE has no IMSI, for instance when making an emergency call without USIM, the UE shall use as default identity UE_ID=0 in the paging frame and i_s formulas above. IMSI is given as sequence of digits of type Integer (0 . . . 9). IMSI shall in the formulae above be interpreted as a decimal integer number, where the first digit given in the sequence represents the highest order digit. For example:

IMSI=12(digit1=1,digit2=2).

In the calculations, this shall be interpreted as the decimal integer "12", not "1×16+2=18".

The RRC_IDLE state tasks can be subdivided into three processes: 1) Public Land Mobile Network (PLMN) selection, 2) Cell selection and reselection, and 3) Location registration and Radio Network Subsystem Application Part User Adaption (RNA) update.

PLMN selection, cell reselection procedures, and location registration are common for both RRC_IDLE state and RRC_INACTIVE state. RNA update is applicable for RRC_INACTIVE state. When a UE is switched on, a public land mobile network (PLMN) is selected by Non-Access-Stratum (NAS). For the selected PLMN, associated radio access technologies (RAT(s)) may be set.

The Non-Access-Stratum shall provide a list of equivalent PLMNs, if available, that the Access-Stratum (AS) shall use for cell selection and cell reselection.

With cell selection, the UE searches for a suitable cell of the selected PLMN, chooses that cell to provide available services, and monitors its control channel. This procedure is defined as "camping on the cell".

The UE shall, if necessary, then register its presence, by means of a NAS registration procedure, in the tracking area of the chosen cell and. As an outcome of a successful Location Registration, the selected PLMN then becomes the registered PLMN.

If the UE finds a more suitable cell, according to the cell reselection criteria, it re-selects onto that cell and camps on it. If the new cell does not belong to at least one tracking area to which the UE is registered, location registration is performed.

In RRC_INACTIVE state, if the new cell does not belong to the configured RNA, an RNA update procedure is performed. If necessary, the UE shall search for higher priority PLMNs at regular time intervals and search for a suitable cell if another PLMN has been selected by NAS.

If the UE loses coverage of the registered PLMN, either a new PLMN is selected automatically (automatic mode), or an indication of available PLMNs is given to the user so that a manual selection can be performed (manual mode).

Registration is not performed by UEs capable of services that need no registration. The purpose of camping on a cell in RRC_IDLE state and RRC_INACTIVE state is fourfold: a) It enables the UE to receive system information from the PLMN; b) When registered and if the UE wishes to establish an RRC connection, it can do this by initially accessing the network on the control channel of the cell on which it is camped, c) If the network needs to send a message or deliver data to the registered UE, it knows (in most cases) the set of tracking areas (in RRC_IDLE state) or RNA (in RRC_INACTIVE state) in which the UE is camped. It can then send a "paging" message for the UE on the control channels of all the cells in the corresponding set of areas. The UE will then receive the paging message and can respond; and d) enables the UE to receive ETWS and CMAS notifications.

Figure 4:
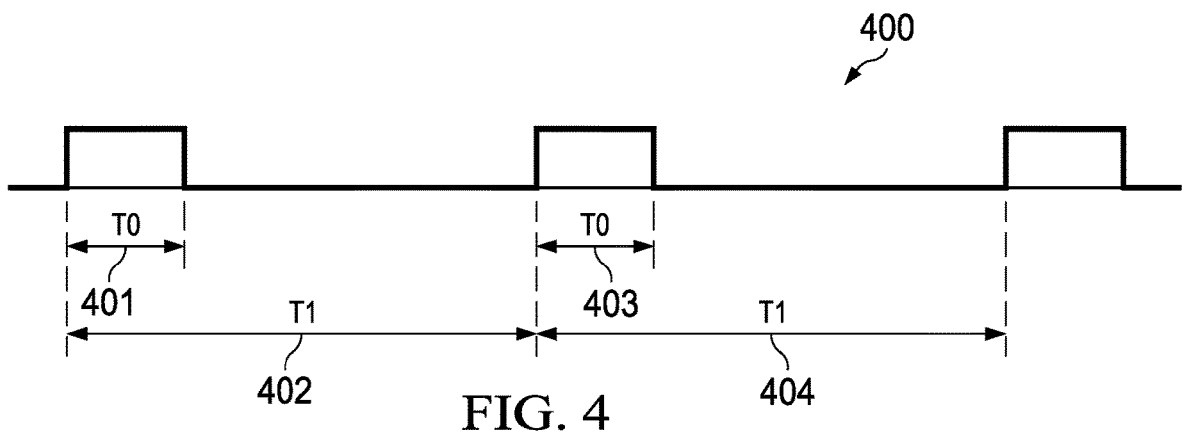
FIG. 4 is a timing diagram of an example DRX operation, as may be performed in a UE in radio resource control idle (RRC_IDLE) state.

FIG. 4 illustrates a timing diagram 400 of an example DRX operation, as may be performed in a UE in RRC_IDLE state. Two consecutive DRX cycles, DRX cycle 402 and DRX cycle 404 are shown. At each DRX cycle, within a specific time duration, a paging occasion (PO) is predetermined for a UE to monitor a control channel for paging, or paging DCI. In this example, the paging occasion 401 and paging occasion 403 are each located at the beginning of, respectively, DRX cycle 402 and DRX cycle 404. When the UE is in RRC_IDLE state, the UE monitors paging DCI during paging occasion 401 and paging occasion 403.

If the UE does not identify a paging indication during the paging occasion 401 and the paging occasion 403, the UE can go to sleep to conserve power outside of paging occasion 401 and paging occasion 403.

In NR, especially in high frequency range operation, a multi-beam operation is expected, and monitoring of a paging occasion within a DRX cycle may be based on a multi-beam operation. In multi-beam operations, the length of one paging occasion is one period of a beam sweeping operation. The UE can assume that the same paging message is repeated in all beams of the sweeping pattern. The selection of the beam(s) for the reception of the paging message is implemented by the UE. The paging message is similar for both radio access network (RAN) initiated paging and core network (CN) initiated paging.

FIG. 5 illustrates a DRX cycle 502 timing diagram 500 for an embodiment multi-beam operation, as may be performed by a UE in RRC_IDLE state. A multi-beam capable base station provides a beam-sweeping pattern composed of three beams B0 520, B1 522, and B2 524, and a paging message is transmitted in all three beams.

As shown, a paging occasion 501 is configured within each DRX cycle 502, during which the UE may monitor paging messages at any of the three different time durations T0 510, T1 512, and T2 514.

In an embodiment, a first beam B0 520 is configured for the first time duration T0 510; a second beam B1 522 is configured for the second time duration T1 512; and a third beam B2 524 is configured for the third time duration T2 514. Accordingly, the first beam B0 520 corresponds to the UE monitoring the control channel for paging during the first time duration T0 510; the second beam B1 522 corresponds to the UE monitoring the control channel for paging during the second time duration T1 512; and the third beam B2 524 corresponds to the UE monitoring the control channel for paging during the third time duration T2 514.

A wake up signal (WUS), as proposed and accepted during the LTE standardization activities, is used to assist a UE with a DRX operation in RRC_IDLE state. The proposal is advantageous for narrow band-internet of things (NB-IoT) type operations.

In an embodiment, a WUS is a physical signal indicating to the UE whether or not a subsequent PDCCH is to be decoded for paging. In some embodiments, the WUS may be decoded without reliance on prior synchronization between the UE and the base station. In other embodiments, the WUS may be decoded using prior synchronization between the UE and the base station.

In an embodiment, at least during one DRX cycle, a WUS may indicate to the UE whether or not to monitor the paging occasion in a single DRX cycle.

The mapping between the WUS and a paging occasion, from the UE perspective, may be one-to-one or one-to-many (N).

The WUS may be cell-specific, group-specific, or UE-specific. In some embodiments, a non-zero time gap may be configured from the end of a configured maximum WUS duration to the associated paging occasion (PO).

FIG. 6 illustrates a DRX cycle 602 timing diagram boo for an embodiment WUS operation, as may be performed by a UE in RRC_IDLE state. In an embodiment, the DRX cycle 602 is configured by a base station and the UE is assigned a paging occasion 601 during which the UE is to monitor the control channel for paging.

As shown, the paging occasion 601 is located at the beginning of the DRX cycle 602. The base station transmits a WUS 610 at a time period T1 620 before the beginning of the paging occasion 601.

The WUS 610 may indicate to the UE a control channel transmission for paging. After the UE receives the WUS 610, the UE determines whether or not to monitor the paging occasion 601 to receive control channel for paging. In the event that the UE determines to not monitor the paging occasion 601, the UE goes to sleep for the entirety of the DRX cycle 602.

The time gap T1 620 between the WUS 610 and the start of paging occasion 601 is configured such that the UE can identify the time at which the WUS 610 is transmitted by the base station in reference to each paging occasion 601.

It is noted that the time gap T1 620 configured between the WUS 610 and the start of the paging occasion 604 may be any time between the end of WUS 610 transmission and the start of the paging occasion 601. In some embodiments, the time gap T1 620 may be configured to be the end of a configured maximum WUS duration to the associated paging occasion. In other embodiments, the time gap T1 620 may be any time duration in a way that a UE can estimate the start time of the associated paging occasion, for example the paging occasion 601, using the configured time gap T1 620 from the time the WUS 610 is received.

In a current WUS operation as defined in the NB-IoT part of the LTE standard, at most one WUS is configured for each paging occasion, as there is either one-to-one or one-to-N mapping between a WUS and a paging occasion.

In high frequency operation cases, however, a paging occasion may be composed of multiple beams operating in a multi-beam operation (i.e., beam sweeping). A method to apply a WUS operation in high frequency operation cases is therefore desired.

One difficulty in applying existing WUS operating concepts, as defined in the NB-IoT part of the LTE standard, to high frequency operating cases is that a UE is unaware as to which beam will be used for the WUS before the start of each paging occasion. As an example, if the UE expected WUS beam is different from the WUS beam that is transmitted by the base station, the UE may be outside of the transmit beam of the WUS or the UE's receive beam is not pointed to the corresponding WUS beam. In such an example, the received signal quality of the WUS from the UE is below detectable range, which may result in the UE not decoding the WUS.

Figure 7:
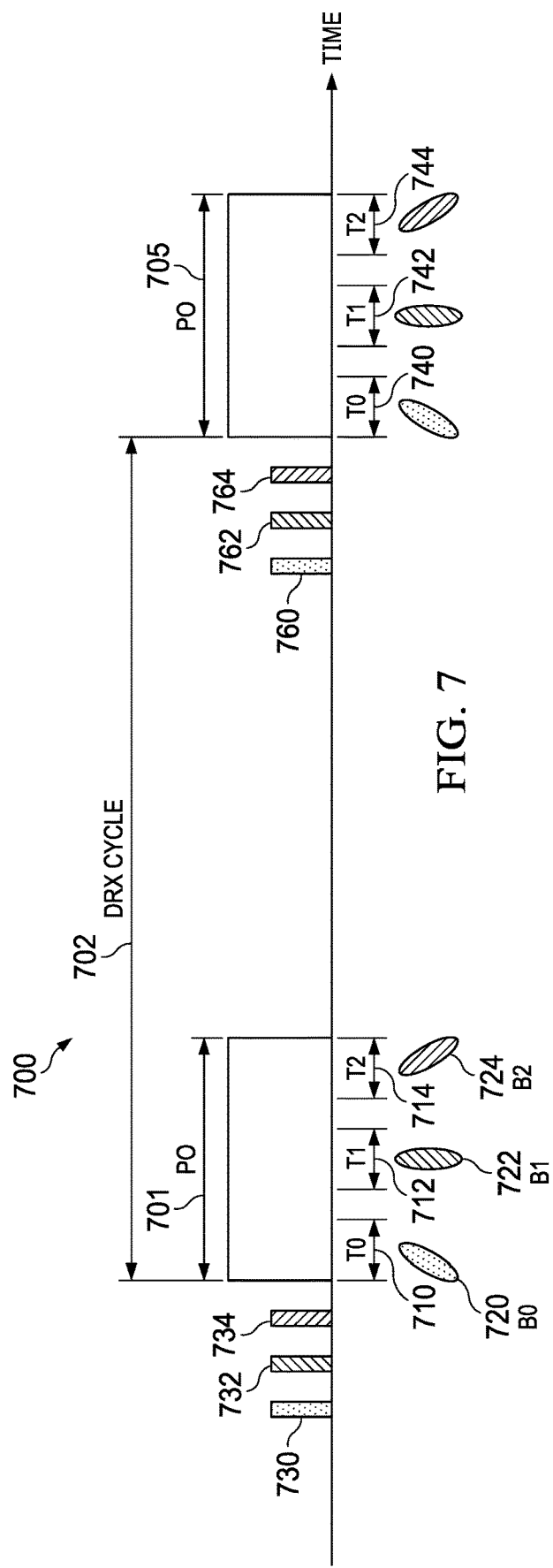
FIG. 7 is a DRX cycle timing diagram for an embodiment multi-WUS operation, as may be performed by a UE.

FIG. 7 illustrates a DRX cycle 702 timing diagram 700 for an embodiment multi-WUS operation, as may be performed by a UE. In this embodiment, a base station transmits a set of WUSs at each DRX cycle 702. The UE monitors control channel for paging, or paging DCI, during each paging occasion (e.g., the first paging occasion 701 and the second paging occasion 705).

In an embodiment, a paging message is transmitted in a beam sweeping manner and the same paging message is transmitted during three different time durations (e.g., T0 710, T1 712, and T2 714) during the first paging occasion 701 and three different time durations (e.g., T0 740, T1 742, and T2 744) during the second paging occasion 705. The paging DCI and corresponding paging message is transmitted using a different beam at each time duration.

In an embodiment, a first beam B0 720 is configured for the first time duration T0 710, 740; a second beam B1 722 is configured for the second time duration T1 712, 742; and a third beam B2 724 is configured for the third time duration T2 714, 744.

Before the start of each paging occasion (i.e., the first paging occasion 701 and the second paging occasion 705), the base station transmits a set of WUSs. Each of the first set of WUSs (i.e., the first WUS 730, the second WUS 732, and the third WUS 734) is transmitted before the first paging occasion 704 and each of the second set of WUSs (i.e., the first WUS 760, the second WUS 762, and the third WUS 764) is transmitted before the second paging occasion 705.

The beam of the first WUS 730 and 760 is associated with the beam used for the paging DCI transmission during the first time duration T0 710, 740. The beam of the second WUS 732 and 762 is associated with the beam used for the paging DCI transmission during the second time duration T1 712, 742. The beam of the third WUS 734 and 764 is associated with the beam used for the paging DCI transmission during the third time duration T2 714, 744.

In embodiments, a predetermined non-zero time gap is configured between the end of the set of WUSs and the start of each paging occasion.

In an embodiment, the UE monitors the signal quality of the WUSs before the start of each paging occasion. As an example, before the start of the first paging occasion 704 the UE monitors the first set of WUSs (i.e., the first WUS 730, the second WUS 732, and the third WUS 734) and identifies which beam serves the UE. This can be identified by selecting the WUS with the best signal quality. By successfully identifying the best WUS, the UE can monitor the corresponding time duration for paging DCI transmission using the same beam within the first paging occasion 701.

As an example, if WUS 730 has the best signal quality, the UE monitors the first time duration T0 710 within the first paging occasion 701 assuming the first beam B0 720 is used for the transmission of paging DCI from the base station.

In one embodiment, the UE identifies the best beam by choosing the WUS with the strongest received power.

In another embodiment, the UE identifies the best beam by choosing the WUS with the highest signal-to-noise ratio (SNR) or signal-to-noise-plus-interference ratio (SINR).

In one embodiment, the WUS includes further information indicating to the UE whether the paging message will be transmitted during the associated paging occasion or not. In this case, by successfully receiving the WUS, the UE can identify if the UE needs to monitor a paging message transmission during the first paging occasion 701. If the UE needs to monitor the paging occasion, the UE can further identify which time duration, within the paging occasion, the UE needs to monitor for paging information transmission. It is noted that in some embodiments, for example in cases where a base station transmits the WUS in a groupcast or a broadcast, the message is not directed to a specific UE. In these embodiments, however, the UE (or any other UE receiving the WUS) may check whether or not a paging message exists for the receiving UE.

In an embodiment, a paging DCI is transmitted in a beam-sweeping manner and a set of WUSs is mapped to a paging occasion. Each beam, that a paging DCI can be transmitted over is associated with a WUS in the set of WUSs. Each WUS is transmitted before the start of a time duration that a paging DCI can be transmitted using the associated beam within the paging occasion. Different WUS in the set of WUSs may use a different beam.

In an embodiment, a non-zero time gap is configured between the end of the configured maximum duration of a WUS and the start of the time duration that a paging DCI can be transmitted using the associated beam within the paging occasion. As an example, a non-zero time gap may be configured between the end of the third WUS 734 and the start of the first time duration 710 in the first set of WUSs. As another example, a non-zero time gap may be configured between the end of the third WUS 764 and the start of the first time duration 740 in the second set of WUSs.

Figure 8:
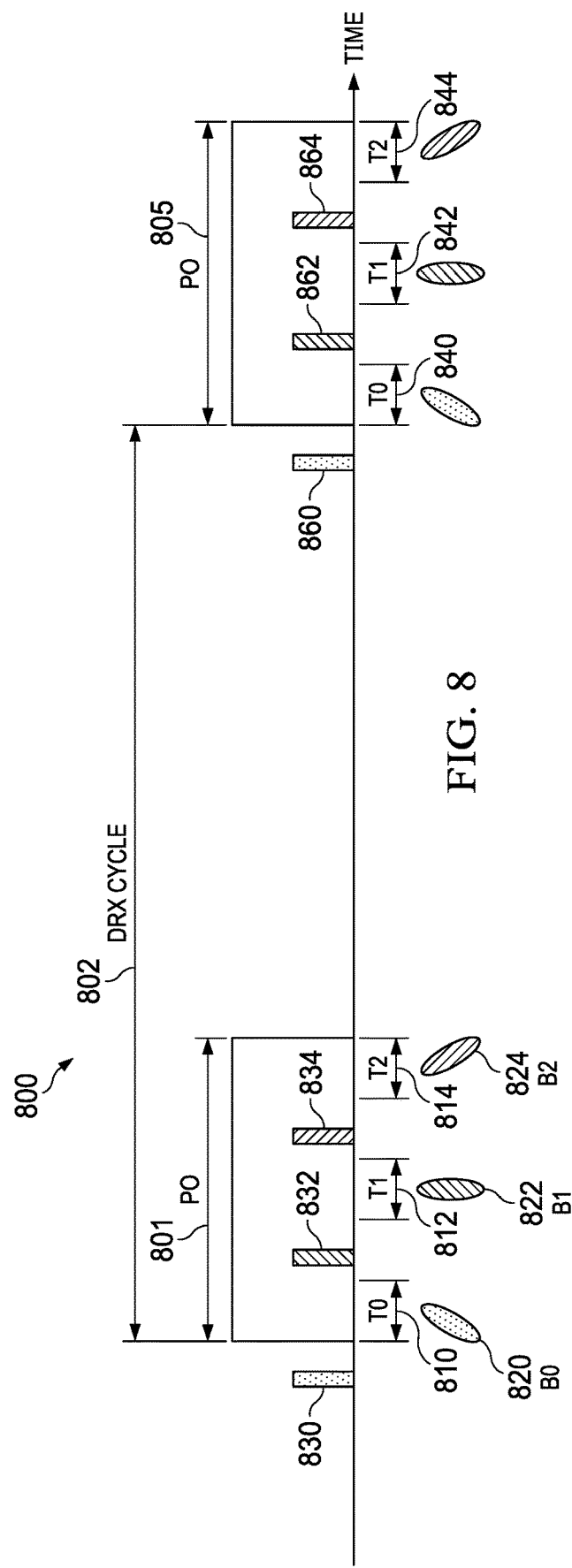
FIG. 8 is a DRX cycle timing diagram for another embodiment multi-WUS operation, as may be performed by a UE.

FIG. 8 illustrates a DRX cycle timing diagram B00 for another embodiment multi-WUS operation, as may be performed by a UE. The UE monitors control channel for paging, or paging DCI, during each paging occasion 801/805.

In an embodiment, a paging message is transmitted in a beam-sweeping manner. The same paging message is transmitted at three different time durations (e.g., T0 810, T1 812, and T2 814) during paging occasion 801 and three different time durations (e.g., T0 840, T1 842, and T2 844) during paging occasion 805. The paging DCI and corresponding paging message is transmitted using a different beam at each time duration.

In an embodiment, a first beam B0 820 is configured for the first time duration T0 810, 840; a second beam B1 822 is configured for the second time duration T1812, 842; and a third beam B2 824 is configured for the third time duration T2 814, 844.

Before the start of each time duration (e.g., T0 810 and 840, T1 812 and 842, and T2 814 and 844), the base station transmits a WUS. In an embodiment, the first WUS 830 is transmitted before the first time duration T0 810, the second WUS 832 is transmitted before the second time duration T1 812, and the third WUS 834 is transmitted before the third time duration T2 814. The first set of WUSs includes the first WUS 830, the second WUS 832, and the third WUS 834. Likewise, the first WUS 860 is transmitted before the first time duration T0 840, the second WUS 862 of the second set is transmitted before the second time duration T1 842, and the third WUS 864 of the second set is transmitted before a third time duration T2 844. The second set of WUSs includes the first WUS 860, the second WUS 862, and the third WUS 864.

The beam of the first WUS 830 and 860 is associated with the beam used for the paging DCI transmission during the first time duration T0 810, 840. The beam of the second WUS 832 and 862 is associated with the beam used for the paging DCI transmission during the second time duration T1 812, 842. The beam of the third WUS 834 in the first set and the third WUS 864 in the second set is associated with the beam used for the paging DCI transmission during the third time duration T2 814, 844.

In an embodiment, the UE monitors the signal quality of each WUS before the start of a corresponding time duration for paging DCI monitoring. As an example, before the start of the first time duration T0 810, the UE monitors the first WUS 830 and checks the signal quality of the first WUS 830. If the signal quality of the first WUS 830 is above a threshold, the UE monitors paging DCI during the first time duration T0 810.

However, if the signal quality of the first WUS 830 is determined to be below the threshold, the UE does not monitor paging DCI during the first time duration T0 810, and the UE monitors the second WUS 832 before the start of the second time duration T1 812 and checks the signal quality of the second WUS 832. If the signal quality of the second WUS 832 is above the threshold, the UE monitors paging DCI during the second time duration T1 812.

However, if the signal quality of the second WUS 832 is determined to be below the threshold, the UE does not monitor paging DCI during the second time duration T1 812, and the UE monitors the third WUS 834 before the start of the third time duration T2 814 and checks the signal quality of the third WUS 834. If the signal quality of the third WUS 834 is above the threshold, the UE monitors paging DCI during the third time duration T2 814.

In some embodiments, as the third WUS 834 is the last WUS within the first set of WUSs, if the signal quality of the third WUS 834 is determined to be below the threshold, the UE may go to sleep until the end of the current DRX cycle 802.

In some embodiments, the UE may alternatively measure downlink reference signals such as synchronization signal block (SSB) from the current base station and check the signal quality of the downlink reference signals.

In some embodiments, the UE may alternatively measure downlink reference signals, such as SSB, from a neighboring base station, which may initiate a handover process.

In some embodiments, the UE may be configured to monitor paging DCI during the third time duration T2 814, even if the signal quality of the third WUS 834 is below the threshold.

Thus, the UE, by successfully identifying at least one WUS with signal quality above the threshold, can monitor the corresponding time duration for paging DCI transmission using the same beam within the paging occasion 801.

In an embodiment, the signal quality is measured based on a receive power level.

In another embodiment, the signal quality is measured based on a signal-to-noise ratio (SNR) or signal-to-noise-plus-interference ratio (SINR).

In one embodiment, the WUS includes further information indicating to the UE whether or not a paging message will be transmitted during the associated time duration.

The UE, by successfully receiving the WUS with its signal quality above the threshold, can determine if the UE needs to monitor a paging message transmission during the associated paging occasion. If the WUS indicates to the UE to monitor the associated paging occasion, the UE can further identify whether or not to monitor paging DCI in the associated time duration within the paging occasion for paging information transmission.

In an embodiment, a paging DCI is transmitted in a beam-sweeping manner and a set of WUSs is mapped to a group of consecutive paging occasions. The set of WUSs are transmitted before the start of a first paging occasion in the group of consecutive paging occasions. Each WUS may use a different beam. Accordingly, each beam that a paging DCI can be transmitted over is associated with a WUS.

In an embodiment, a non-zero time gap is configured between the end of the WUS in the set of WUSs and the start of time duration that paging DCI is transmitted in the associated beam in the first paging occasion in the group of consecutive paging occasions. As an example, a non-zero time gap may be configured between the end of the first WUS 830 and the first time duration 810, a non-zero time gap be configured between the end of the second WUS 832 and the second time duration 812, and so forth.

The UE monitors WUSs before the start of the first paging occasion in the group of consecutive paging occasions, and identifies the WUS with the best signal quality. The UE monitors the time duration that a paging DCI is transmitted with the beam that is associated to the identified WUS.

In one embodiment, a non-zero time gap is configured from the end of a configured maximum duration of the set of WUSs to the associated paging occasion.

Figure 9:
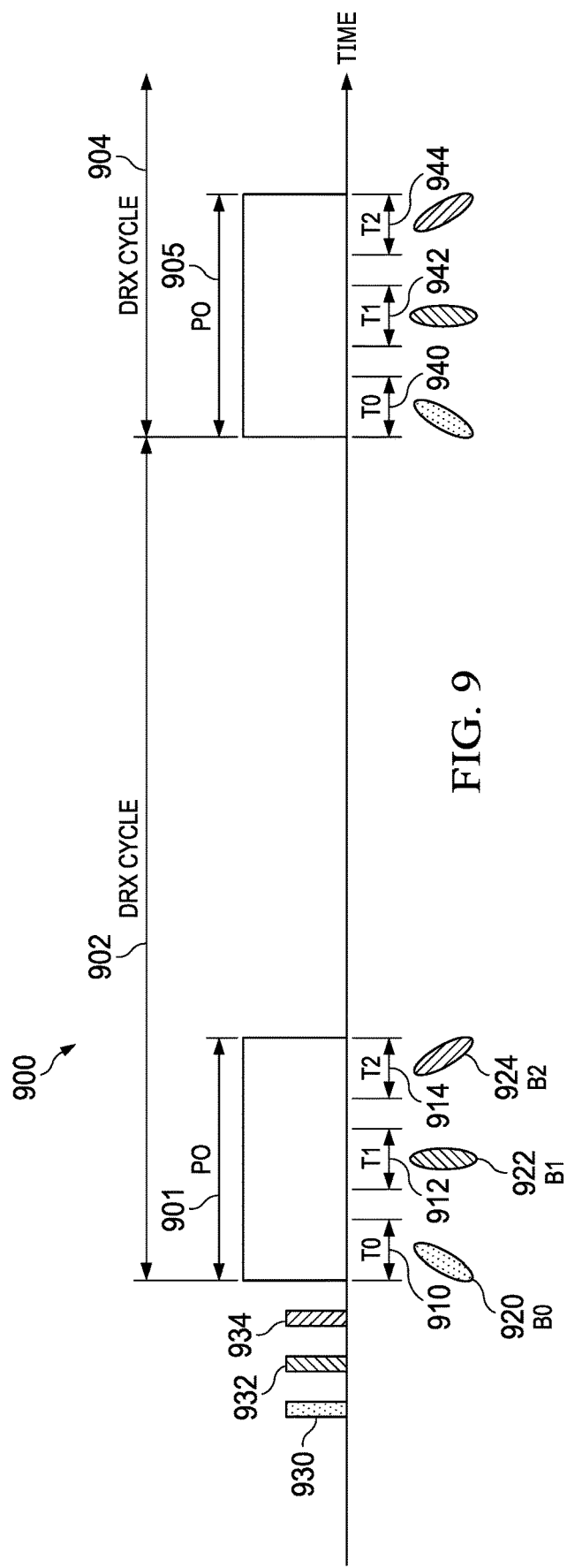
FIG. 9 is a multi-DRX cycle timing diagram for an embodiment multi-WUS operation, as may be performed by a UE.

FIG. 9 illustrates a multi-DRX cycle timing diagram 900 for an embodiment multi-WUS operation, as may be performed by a UE. A base station transmits a set of WUSs for two consecutive DRX cycles (e.g., first DRX cycle 902 and second DRX cycle 904). The UE monitors control channel for paging, or paging DCI, during each paging occasion (i.e., the first paging occasion 901 and the second paging occasion 905).

In an embodiment, a paging message is transmitted in a beam-sweeping manner. The same paging message is transmitted at three different time durations (e.g., T0 910, T1 912, and T2 914) during the first paging occasion 901 and three different time durations (e.g., T0 940, T1 942, and T2 944) during the second paging occasion 905. The paging DCI and corresponding paging message is transmitted using a different beam at each time duration.

In this embodiment, a first beam B0 920 is configured for the first time duration T0 910, 940; a second beam B1 922 is configured for the second time duration T1 912, 942; and a third beam B2 924 is configured for the third time duration T2 914, 944.

Before the start of each of the two consecutive paging occasions (i.e., the first paging occasion 901 and the second paging occasion 905), the base station transmits a set of WUSs. The beam of the first WUS 930 is associated with the beam used for paging a DCI transmission during the first time duration T0 910 and 940. The beam of the second WUS 932 is associated with the beam used for paging a DCI transmission during a second time duration T1 912 and 942. The beam of the third WUS 934 is associated with the beam used for paging a DCI transmission during a third time duration T2 914 and 944.

In some embodiments, a predetermined non-zero gap time is configured between the end of the set of WUSs and the start of the first paging occasion of the two consecutive paging occasions.

In such an embodiment, the UE monitors the signal quality of each WUS before the start of two consecutive paging occasions. As an example, the UE monitors the first WUS 930, the second WUS 932, and the third WUS 934, before the start of the first paging occasion 901, and determines the beam that serves the UE. For example, the determining may be by selecting the WUS with the best signal quality. The successful determining of the WUS allows the UE to monitor the corresponding time duration for paging DCI transmission using the same beam within the first paging occasion 901 and the second paging occasion 905.

In an embodiment, if the UE determines that the first WUS 930 corresponds to a WUS in set of WUSs having the best signal quality, the UE monitors the first time duration T0 910 and 940 within the first paging occasion 901 and the second paging occasion 905 assuming the first beam B0 920 is used for the transmission of paging DCI from the base station.

In an embodiment, the UE determines the best beam by choosing the WUS with the strongest, or highest, received power.

In another embodiment, the UE determines the best beam by choosing the WUS with the highest signal-to-noise ratio (SNR) or signal-to-noise-plus-interference ratio (SINR) within the set of WUSs.

In one embodiment, the WUS includes further information to the UE indicating whether or not a paging message is to be transmitted during the associated paging occasions. The successful reception of the WUS by the UE, allows the UE to identify if the UE needs to monitor a paging message transmission during the first paging occasion 901 and/or the second paging occasion 905 and if the UE needs to monitor, the UE can further identify which time duration within the paging occasion the UE need to monitor for a paging information transmission.

In an embodiment, a paging DCI is transmitted in a beam-sweeping manner and a set of WUSs is mapped to a group of consecutive paging occasions. Each beam that a paging DCI can be transmitted over is associated with a different WUS in the set of WUSs. Each WUS may be transmitted before the start of a time duration that a paging DCI can be transmitted over using the associated beam of the first paging occasion within the group of consecutive paging occasions. Each WUS may be associated with a different beam.

In some embodiments, a non-zero time gap may be configured between the end of configured maximum duration of a WUS, within the set of WUSs, and the start of the time duration that a paging DCI can be transmitted using the associated beam of the paging occasion within the group of consecutive paging occasions. As an example, a non-zero time gap may be configured between the end of the third WUS 934 and the start of the first time duration 910 in the first set of WUSs. As another example, a non-zero time gap may be configured between the end of the third WUS 964 and the start of the first time duration 940 in the second set of WUSs.

Figure 10:
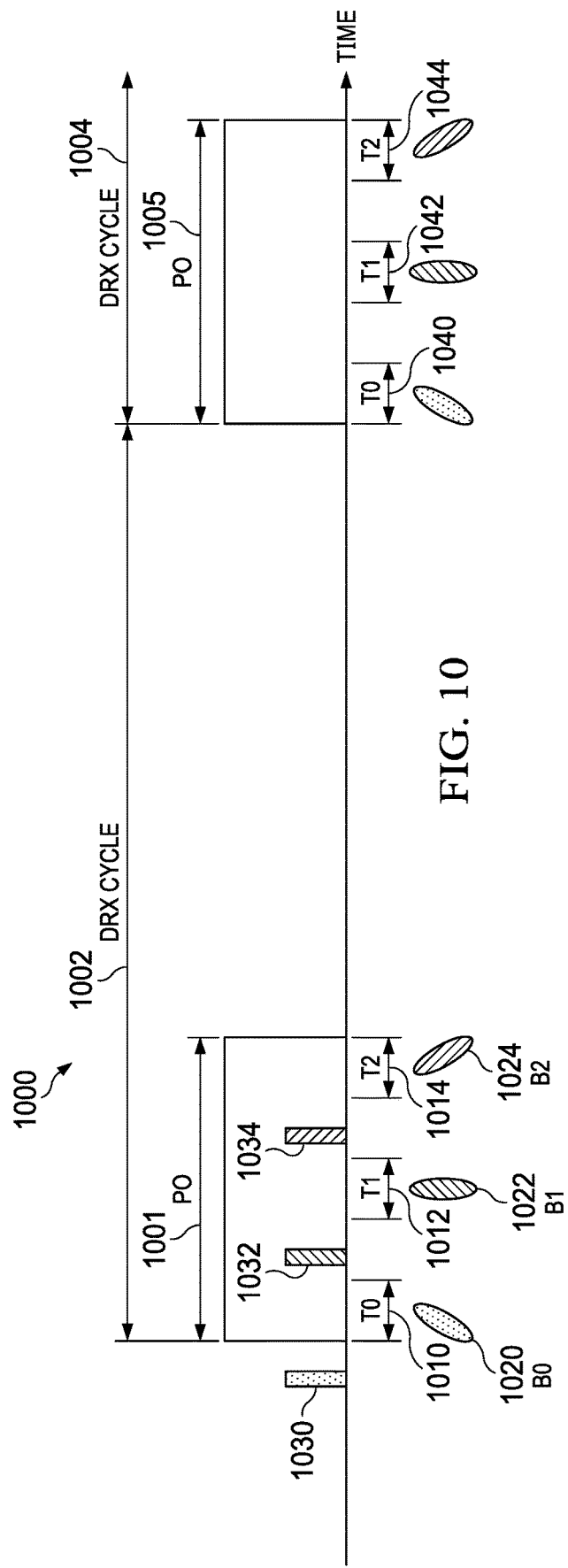
FIG. 10 is a multi-DRX cycle timing diagram for another embodiment multi-WUS operation, as may be performed by a UE.

FIG. 10 illustrates a multi-DRX cycle timing diagram woo for another embodiment multi-WUS operation, as may be performed by a UE. A base station transmits a set of WUSs for two consecutive DRX cycles (i.e., the first DRX cycle 1002 and the second DRX cycle 1004). The UE monitors a control channel for a paging, or a paging DCI, during each paging occasion (i.e., the first paging occasion 1001 and the second paging occasion 1005).

In an embodiment, a paging message is transmitted in a beam-sweeping manner. The same paging message is transmitted at three different time durations (e.g., T0 low, T1 1012, and T2 1014) during the first paging occasion 1001 and three different time durations (e.g., T0 1040, T1 1042, and T2 1044) during the second paging occasion 1005. The paging DCI and corresponding paging message is transmitted using a different beam at each time duration.

In this embodiment, a first beam B0 1020 is configured for the first time duration T0 low, 1040; a second beam B1 1022 is configured for the second time duration T1 1012, 1042; and a third beam B2 1024 is configured for the third time duration T2 1014, 1044.

Before the start of each time duration (e.g., T0 low, T1 1012, and T2 1014) within the first paging occasion low, of the two consecutive paging occasions, the base station transmits a WUS within a set of WUSs.

In this embodiment, WUS 1030 is transmitted before the first time duration T0 low, WUS 1032 is transmitted before the second time duration T1 1012, and the WUS 1034 is transmitted before the third time duration T2 1014. The first set of WUSs includes WUSs (i.e., WUS 1030, WUS 1032, and WUS 1034). The beam of WUS 1030 is associated with a beam used for paging a DCI transmission during the first time durations T0 low, 1040. The beam of WUS 1032 is associated with a beam used for paging a DCI transmitted during the second time durations T1 1012 and 1042. The beam of the WUS 1034 is associated with a beam used for paging a DCI transmission during the third time duration T2 1014, 1044.

In embodiments, a predetermined non-zero time gap may be configured between the end of each WUS and the start of the corresponding time duration within the first paging occasion 1001 of the two consecutive paging occasions.

In these embodiments, the UE is configured to monitor the signal quality of one or more WUS, within the set of WUSs, before the start of a corresponding time duration for paging a DCI transmission within the first paging occasion 1001 of the two consecutive paging occasions.

As an example, before the start of the first time duration T0 1010 in the first paging occasion low, the UE monitors the WUS 1030 and checks the signal quality of the WUS 1030. If the signal quality of WUS 1030 is above a threshold, the UE monitors paging DCI during the first time duration T0 low in the first paging occasion 1001 and during the first time duration T0 1040 in the second paging occasion 1005.

However, if the signal quality of WUS 1030 is determined to be below the threshold, the UE does not monitor paging DCI during the first time duration T0 low in the first paging occasion 1001 or during the first time duration T0 1040 in the second paging occasion 1005. The UE monitors the WUS 1032 before the start of the second time duration T1 1012 in the first paging occasion 1001 and checks the signal quality of WUS 1032. If the signal quality of WUS 1032 is determined to be above the threshold, the UE monitors paging DCI during the second time duration T1 1012 in the first paging occasion 1001 and during the second time duration T1 1042 in the second paging occasion 1005.

However, if the signal quality of WUS 1032 is determined to be below the threshold, the UE does not monitor paging DCI during the second time duration T1 1012 in the first paging occasion 1001 or during the second time duration T1 1042 in the second paging occasion 1005. The UE monitors the WUS 1034 before the start of the third time duration T2 1014 in the first paging occasion 1001 and checks the signal quality of the WUS 1034. If the signal quality of the WUS 1034 is determined to be above the threshold, the UE monitors paging DCI during the third time duration T2 1014 in the first paging occasion 1001 and during the third time duration T2 1044 in the second paging occasion 1005.

In some embodiments, as the WUS 1034 is the last WUS within the first set of WUSs, if the signal quality of the WUS 1034 is determined to be below the threshold, the UE may go to sleep until the end of the first DRX cycle 1002.

In some embodiment, the UE may go to sleep until the end of the second DRX cycle 1004.

In other embodiments, the UE may alternatively measure downlink reference signals, such as SSB, from the current base station and check the signal quality of the downlink reference signals.

In some embodiments, the UE may measure alternatively downlink reference signals, such as SSB, from neighboring base station, and a handover process may be initiated.

In an embodiment, the UE may monitor paging DCI during the third time duration T2 1014 in the first paging occasion 1001 and during the third time duration T2 1044 in the second paging occasion 1005.

Regardless, the successful identification, of at least one WUS, with a signal quality above a threshold, by the UE allows the UE to monitor a corresponding time duration for paging DCI transmission using the same beam within the first paging occasion 1001 and within the second paging occasion 1005.

In one embodiment, the signal quality is measured based on a receive power level.

In another embodiment, the signal quality is measured based on a signal-to-noise ratio (SNR) or signal-to-noise-plus-interference ratio (SINR).

In one embodiment, the WUS includes further information to the UE indicating whether or not a paging message is to be transmitted during the associated time duration. The successful reception of the WUS by the UE, having a signal quality above the threshold, allows the UE to identify if the UE needs to monitor paging message transmissions during the associated paging occasion (e.g., first paging occasion 1001 and/or second paging occasion 1005. If the WUS indicates to the UE that the UE needs to monitor the associated paging occasion(s), the UE can further identify the UE needs to monitor paging DCI in the associated time duration within the paging occasion(s) for paging information transmission.

Figure 11A:
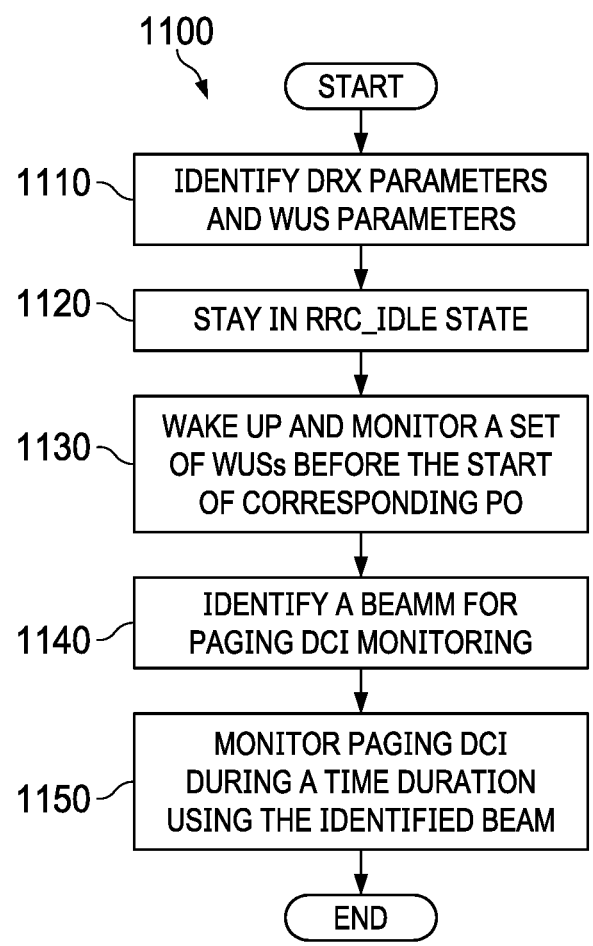
FIG. 11A is a flowchart of an embodiment method for signaling in power save mode in a DRX operation, as may be performed by a UE.

FIG. 11A illustrates a flowchart of an embodiment method 1100 for signaling in power save mode in a DRX operation, as may be performed by a UE.

The embodiment method 1100 includes receiving, by the UE, a WUS from a base station. The WUS indicates to the UE to monitor a control channel of a respective beam in a multi-beam operation for an associated paging message during a configured period of a paging occasion of a discontinuous reception (DRX) cycle. The WUS further indicates to the UE to additionally monitor the control channel of the respective beam in the set of beams during the paging occasion in accordance with the received WUS.

At step 1110, the UE identifies DRX and corresponding WUS parameters. The identification is performed prior to the utilization of the DRX operation in the RRC_IDLE state at step 1120. The UE remains in RRC_IDLE state during a DRX cycle when no paging DCI is monitored.

At step 1130, at a time that a set of WUSs is to be transmitted before a start of a corresponding paging occasion, the UE wakes up and monitors signal quality of WUSs in the set of WUSs.

At step 1140, the UE identifies a first WUS with good signal quality among the set of WUSs, based on the received signal quality of each WUS in the set of WUSs. The UE also identifies a beam that is used for the first WUS transmission. As the beam is to be used for paging DCI transmission at an associated time duration, the beam for paging DCI monitoring is also identified. At step 1150, during the associated time duration determined in step 1140, the UE monitors paging DCI using the identified beam.

Figure 11B:
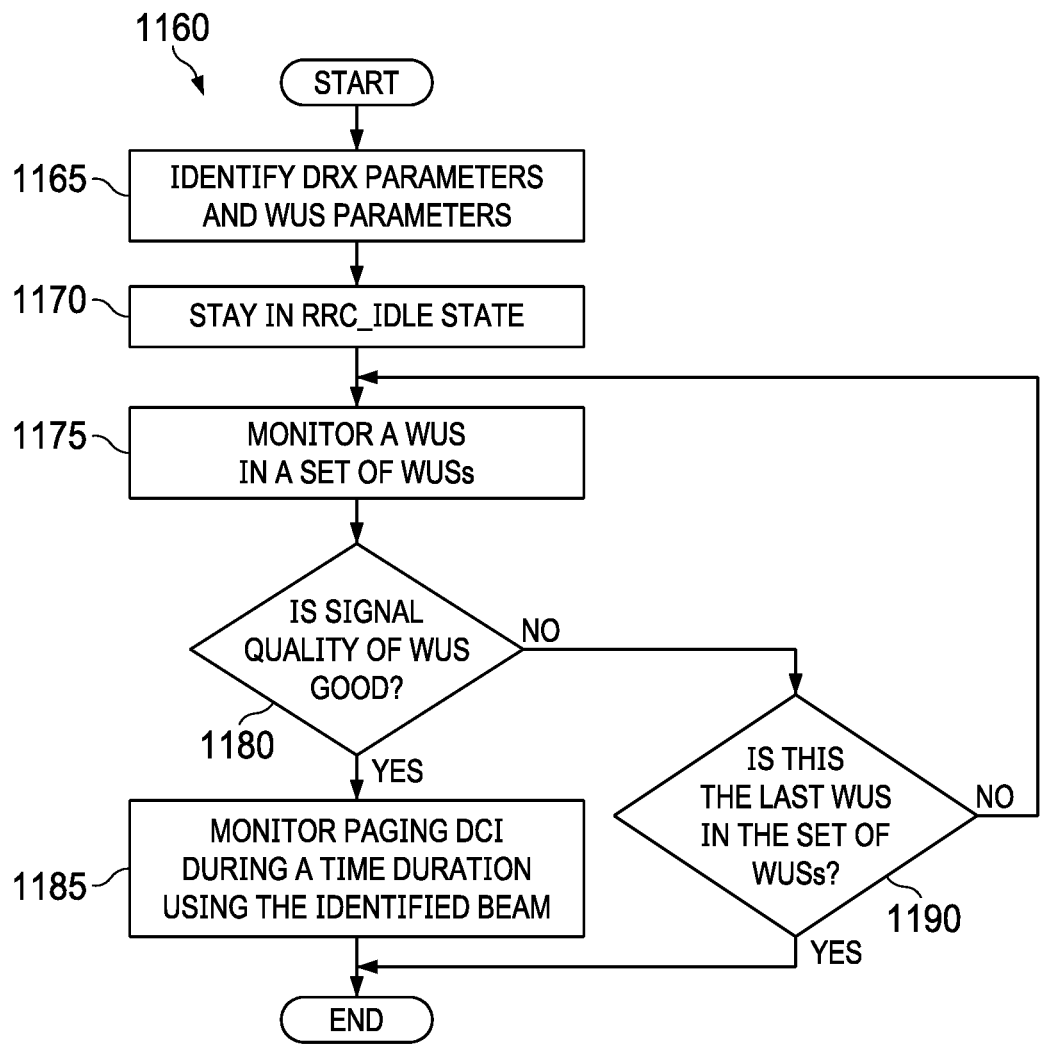
FIG. 11B is a flowchart of another embodiment method for signaling in power save mode in a DRX operation, as may be performed by a UE.

FIG. 11B illustrates a flowchart of another embodiment method 1160 for signaling in power save mode in a DRX operation, as may be performed by a UE. At step 1165, the UE identifies DRX and corresponding WUS parameters. Step 1165 occurs before the UE utilizes DRX operation in RRC_IDLE state. At step 1170, the UE starts DRX operation in RRC_IDLE state. The UE remains in RRC_IDLE state during a DRX cycle when no paging DCI is monitored.

At step 1175, at a time that a first WUS in a set of WUSs is to be transmitted before a start of corresponding duration in a paging occasion, the UE wakes up and monitors the first WUS in the set of WUSs. At step 1180, if the signal quality of the first WUS in the set of WUSs meets a threshold, at step 1185, the UE monitors paging DCI at associated time duration using the beam that has been used for the first WUS. However, at step 1180, if the signal quality of the first WUS in the set of WUSs is below a threshold, at step 1190, the UE monitors the next WUS in the set of WUSs and continues the same operation until the UE monitors all the WUS in the set of WUSs.

FIG. 12 illustrates a flowchart of an embodiment method 1200 for signaling in power save mode in a DRX operation, as may be performed by a base station. At step 1210, the base station transmits WUSs to the UE. Each WUS indicates to the UE to monitor a control channel of a different beam in a multi-beam operation for an associated paging message during a configured period of a paging occasion of a discontinuous reception (DRX) cycle. In some embodiments, the control channel is a physical downlink control channel (PDCCH). In embodiments, each WUS is transmitted over a different respective beam. In one embodiment, each paging message is a paging downlink control indicator (DCI), a radio access network (RAN) initiated paging, or core network (CN) initiated paging. In embodiments, a length of a paging occasion corresponds to one period of beam sweeping in a multi-beam operation.

In some embodiments, each WUS may be associated with more than one control channel beam. As an example, a first WUS may be associated with a first and second control channel beam, a second WUS may be associated with a third and fourth control channel beam, and a third WUS may be associated with a fifth and sixth control channel beam. In other words, a WUS is not limited to a single control channel beam.

Each beam in the multi-beam operation may be quasi co-located (QCL'ed) with a corresponding WUS of WUSs. Additionally, a plurality of beams in the multi-beam operation may be quasi co-located (QCL'ed) with a corresponding WUS in the plurality of WUSs. Each beam may be a synchronization signal block (SSB) beam.

In some embodiments, each WUS may also indicate to the UE to monitor the control channel of the respective beam, during the paging occasion, for N consecutive DRX cycles. In embodiments, the WUSs include a one-to-N mapping with one or more paging occasions in multiple consecutive DRX cycles, wherein N is an integer greater than zero.

In one embodiment, each WUS indicates to the UE that the plurality of paging messages are to be transmitted to the UE during the paging occasion. In other embodiments, each WUS indicates to the UE that the plurality of paging messages are not to be transmitted to the UE during the paging occasion. In some embodiments, the plurality of paging messages may include multiple instances of the same paging message. In other embodiments, the plurality of paging messages may include multiple different paging messages.

In some embodiments, the WUSs are transmitted in a unicast message, a groupcast message, or a broadcast message. In some embodiments, the WUSs are transmitted before a beginning of the paging occasion. In some embodiments, each WUS is transmitted after an elapsed non-zero time gap from a transmission of a previous WUS in the plurality of WUSs.

In some embodiments, the base station may configure the WUSs before transmitting each WUS to the UE. In such an embodiment, the configuring may be cell-specific, group-specific, or UE-specific.

In some embodiments, the WUS indicates to the UE to monitor a control channel of a second different beam in the multi-beam operation for a second associated paging message during a second configured period of the paging occasion of the discontinuous reception (DRX) cycle. Each WUS may indicate to the UE an associated identifier (ID) of an intended UE associated with the WUS.

At step 1220, the base station transmits a plurality of paging messages to the UE during the paging occasion. Each paging message is transmitted in accordance with an associated WUS over the different beam at the configured period of the paging occasion. In some embodiments, one or more of the WUSs are transmitted to the UE using a different or a same frequency resource, and/or a different or a same sequence.

In some embodiments, the base station then may transmit the WUSs to a second UE. Each WUS indicating to the second UE to monitor a second control channel of a different beam in a second multi-beam operation for an associated paging message during a configured period of a second paging occasion of a discontinuous reception (DRX) cycle of the second UE. The base station then may transmit paging messages to the second UE during the second paging occasion. Each paging message is transmitted in accordance with an associated WUS over the different beam at the configured period of the paging occasion of the second UE.

In some embodiments, each paging message is transmitted multiple times over different multi-beam operations.

In embodiments, a time gap between an end of the transmitting of the WUSs and a beginning of the transmitting of the page messages is a non-zero time gap. In some embodiments, a time gap between an end of a transmitting of each WUS and a beginning of a transmitting of the associated paging message is a non-zero time gap. In either embodiment, the non-zero time gap may be pre-determined in accordance with a radio resource control (RRC) protocol.

In embodiments, one or more of the WUSs are transmitted during the paging occasion. In this embodiment, each respective WUS is transmitted before the associated paging message is transmitted.

In any preceding embodiment, when a paging message is transmitted in a beam-sweeping manner, each beam that the paging message is transmitted over may be QCL'ed with one of WUSs in a set of WUSs. Similarly, PDCCH for the paging that is transmitted in each beam may be QCL'ed with one of WUSs in the set of WUSs. Moreover, a different beam that the paging message is transmitted over may be mapped to one WUS within the set of WUSs. For example, when a paging message is transmitted in a beam sweeping manner and the same paging message is transmitted in four different time durations using four different beams (e.g., B0, B1, B2, and B3), the set of WUSs is composed of two WUSs, where B0 and B1 are mapped to the first WUS in the set of WUSs, and B2 and B3 are mapped to the second WUS in the set of WUSs.

In any preceding embodiment, each WUS in a set of WUSs may be associated to a beam of a cell-specific broadcasting signal that is transmitted in a beam-sweeping manner. The cell-specific broadcasting signal may be synchronization signals (SS) and/or physical broadcast channels (PBCH). Alternatively, each WUS in the set of WUSs is QCL'ed with a corresponding SSB beam.

In any preceding embodiment, WUSs in a set of WUSs may have the following information (but not limited): indication of a used beam, indication if a UE needs to monitor control channel paging during the corresponding paging occasion(s), or indication of a UE identification (ID).

In any preceding embodiment, a WUS in a set of WUSs is made up of one or more sequences, and these sequences may have some of the following features: different WUS in the set of WUSs may use the same sequence, different WUS in the set of WUSs may use different sequence, different WUS in the set of WUSs may be sent at different time, or different WUS in the set of WUSs may be sent in different frequency resource.

In any preceding embodiment, a different WUS in a set of WUSs may deliver the same information except the indication of a used beam. In one example, if the different WUS in the set of WUSs is sent in a different time using a different beam, the different WUS in the set of WUSs is sent using the same sequence, as the different sequence delivers different information except the indication of the used beam. In another example, the different sequence may be allocated to a WUS at least depending on a used beam or an indication if the UE needs to monitor control channel for paging. And, all WUSs in the set of WUSs use a sequence for the same information on the indication if the UE needs to monitor control channel for paging, while a different WUS may use a different sequence as the sequence depends on the used beam.

In any preceding embodiment, if there is no need to page on one or more paging occasion, all WUSs in a corresponding set of WUSs may not be transmitted. In this example scenario, when a UE monitors WUSs corresponding to a paging occasion, if the UE does not receive any WUS with good signal quality, the UE may be configured to not monitor control channel for paging in the paging occasion, and the UE may go to sleep state throughout the DRX cycle.

In any preceding embodiment, the time gap between each WUS in a set of WUSs and a time duration that paging DCI can be transmitted using the associated beam may be predetermined. In one example, this predetermined values are indicated from a base station using an RRC parameter.

In any preceding embodiment, there may be non-zero gap between each WUS in a set of WUSs.

It is noted that throughout this disclosure, a beam represents a transmit beam or a receive beam. Also, a beam can also represent a beam pair link (BPL), which implies a combination of transmit beam from the transmitter side and receive beam from the receiver side.

FIG. 13 illustrates a block diagram of an embodiment processing system 1300 for performing methods described herein, which may be installed in a host device. As shown, the processing system 1300 includes a processor 1302, a memory 1304, and interfaces 1306, 1308, 1310 which may (or may not) be arranged as shown in FIG. 13.

The processor 1302 may be any component or collection of components adapted to perform computations and/or other processing related tasks, and the memory 1304 may be any component or collection of components adapted to store programming and/or instructions for execution by the processor 1302.

In an embodiment, the memory 1304 includes a non-transitory computer readable medium. The interfaces 1306, 1308, 1310 may be any component or collection of components that allow the processing system 1300 to communicate with other devices/components and/or a user.

In an embodiment, one or more of the interfaces 1306, 1308, 1310 may be adapted to communicate data, control, or management messages from the processor 1302 to applications installed on the host device and/or a remote device. As another embodiment, one or more of the interfaces 1306, 1308, 1310 may be adapted to allow a user or user device (e.g., personal computer (PC), etc.) to interact/communicate with the processing system 1300.

The processing system 1300 may include additional components not depicted in FIG. 13, such as long-term storage (e.g., non-volatile memory, etc.).

In some embodiments, the processing system 1300 is included in a network device that is accessing, or part otherwise of, a telecommunications network.

In one embodiment, the processing system 1300 is in a network-side device in a wireless or wireline telecommunications network, such as a base station, a relay station, a scheduler, a controller, a gateway, a router, an applications server, or any other device in the telecommunications network.

In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

In some embodiments, one or more of the interfaces 1306, 1308, 1310 connects the processing system 1300 to a transceiver adapted to transmit and receive signaling over the telecommunications network.

FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412.

The network-side interface 1402 may include any component or collection of components adapted to transmit or receive signaling over a wireless or wireline telecommunications network.

The coupler 1404 may include any component or collection of components adapted to facilitate bi-directional communication over the network-side interface 1402.

The transmitter 1406 may include any component or collection of components (e.g., up-converter, power amplifier, etc.) adapted to convert a baseband signal into a modulated carrier signal suitable for transmission over the network-side interface 1402.

The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa.

The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. In some embodiments, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements.

In some embodiments, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc.

In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions, and alterations may be made without departing from the spirit and scope of this disclosure as defined by the appended claims. The same elements are designated with the same reference numbers in the various figures.

Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

The invention claimed is:

1. A method, comprising:
   transmitting, by a base station, wake up signals (WUSs) to a user equipment (UE), wherein each WUS of the WUSs indicates the UE to monitor, during a configured period of a paging occasion of a discontinuous reception (DRX) cycle, control channels for an associated paging message for each control channel, wherein each control channel of the control channels is associated with a different beam in a multi-beam operation; and
   transmitting, by the base station, paging messages to the UE during the paging occasion, each paging message of the paging messages being transmitted over the different beam at the configured period of the paging occasion, for each WUS of the WUSs there being a different corresponding paging message of the paging messages.

2. The method of claim 1, wherein each paging message of the paging messages is a paging downlink control indicator (DCI).

3. The method of claim 1, wherein the WUSs are transmitted before a beginning of the paging occasion.

4. The method of claim 1, wherein a time gap between an end of the transmitting the WUSs and a beginning of the transmitting the paging messages is not zero.

5. The method of claim 4, wherein the time gap is indicated in radio resource control (RRC) signaling.

6. The method of claim 1, wherein each WUS of the WUSs further indicates the UE to monitor a corresponding control channel of a corresponding different beam, during the paging occasion, for N consecutive DRX cycles, N being an integer greater than or equal to one.

7. The method of claim 1, wherein each control channel of the control channels is a different physical downlink control channel (PDCCH).

8. The method of claim 1, wherein each WUS of the WUSs is transmitted over a different respective beam.

9. A method, comprising:
   receiving, by a user equipment (UE), wake up signals (WUSs), wherein each WUS of the WUSs indicates the UE to monitor, during a configured period of a paging occasion of a discontinuous reception (DRX) cycle, control channels for an associated paging message for each control channel, wherein each control channel of the control channels is associated with a different beam in a multi-beam operation; and
   monitoring, by the UE, at least one control channel of the control channels to receive paging messages during the paging occasion, each paging message of the paging messages being transmitted over the different beam at the configured period of the paging occasion, for each WUS of the WUSs there being a different corresponding paging message of the paging messages.

10. The method of claim 9, wherein each paging message of the paging messages is a paging downlink control indicator (DCI).

11. The method of claim 9, wherein the WUSs are transmitted before a beginning of the paging occasion.

12. The method of claim 9, wherein a time gap between an end of the receiving the WUSs and a beginning of receiving the paging messages is not zero.

13. The method of claim 12, wherein the time gap is indicated in radio resource control (RRC) signaling.

14. The method of claim 9, wherein each WUS of the WUSs further indicates the UE to monitor a corresponding control channel of a corresponding different beam, during the paging occasion, for N consecutive DRX cycles, N being an integer greater than or equal to one.

15. The method of claim 9, wherein each control channel of the control channels is a different physical downlink control channel (PDCCH).

16. The method of claim 9, wherein each WUS of the WUSs is received over a different respective beam.

17. A base station, comprising:
   at least one processor; and
   a non-transitory computer readable storage medium storing programming, the programming including instructions that, when executed by the at least one processor, cause the base station to perform operations including:
   transmitting wake up signals (WUSs) to a user equipment (UE), wherein each WUS of the WUSs indicates the UE to monitor, during a configured period of a paging occasion of a discontinuous reception (DRX) cycle, control channels for an associated paging message for each control channel, wherein each control channel of the control channels is associated with a different beam in a multi-beam operation; and
   transmitting paging messages to the UE during the paging occasion, each paging message of the paging messages being transmitted over the different beam at the configured period of the paging occasion, for each WUS of the WUSs there being a different corresponding paging message of the paging messages.

18. The base station of claim 17, wherein each paging message of the paging messages is a paging downlink control indicator (DCI).

19. A user equipment (UE), comprising:
   at least one processor; and
   a non-transitory computer readable storage medium storing programming, the programming including instructions that, when executed by the at least one processor, cause the UE to perform operations including:
   receiving wake up signals (WUSs), wherein each WUS of the WUSs indicates the UE to monitor, during a configured period of a paging occasion of a discontinuous reception (DRX) cycle, control channels for an associated paging message for each control channel, wherein each control channel of the control channels is associated with a different beam in a multi-beam operation; and monitoring at least one control channel of the control channels to receive paging messages during the paging occasion, each paging message of the paging messages being transmitted over the different beam at the configured period of the paging occasion, for each WUS of the WUSs there being a different corresponding paging message of the paging messages.

20. The UE of claim 19, wherein each paging message of the paging messages is a paging downlink control indicator (DCI).

* * * * *